United States Patent [19]

Knutson

[11] Patent Number: 5,541,576
[45] Date of Patent: Jul. 30, 1996

[54] SIX CHANNEL DUAL DISPLAY MFC MONITOR

[75] Inventor: Paul Knutson, San Antonio, Tex.

[73] Assignees: Sony Corporation, Japan; Sony Electronics, Inc., N.J.

[21] Appl. No.: 527,388

[22] Filed: Sep. 13, 1995

Related U.S. Application Data

[63] Continuation of Ser. No. 92,220, Jul. 16, 1993, abandoned.

[51] Int. Cl.⁶ ............................................. G08B 26/00
[52] U.S. Cl. ................ 340/518; 340/870.03; 345/39; 239/71; 239/74; 73/195; 73/861
[58] Field of Search ............................. 340/500, 501, 340/517, 518, 522, 870.02, 870.04, 870.44, 870.13, 870.11, 870.12, 525, 870.03; 345/1, 2, 39; 204/298.03, 298.32, 192.13, 193.33; 239/71, 74; 73/195, 861

[56] References Cited

U.S. PATENT DOCUMENTS

| | | | |
|---|---|---|---|
| 3,415,274 | 12/1968 | Kiefer et al. | 73/195 |
| 4,262,287 | 4/1981 | McLoughlin et al. | 73/195 |
| 4,474,061 | 10/1984 | Parker | 73/861 |
| 4,541,563 | 9/1985 | Uetsuhara | 239/71 |
| 4,624,745 | 11/1986 | Sande et al. | 162/252 |
| 4,827,430 | 5/1989 | Aid et al. | 73/235 |
| 4,906,970 | 3/1990 | Momura | 340/525 |
| 4,949,670 | 8/1990 | Krogh | 204/298.32 |
| 4,962,371 | 10/1990 | Repp et al. | 340/501 |
| 4,991,123 | 2/1991 | Casamassima | 340/525 |
| 5,025,135 | 6/1991 | Gesche et al. | 204/298.32 |

Primary Examiner—John K. Peng
Assistant Examiner—Daniel J. Wu
Attorney, Agent, or Firm—Ronald P. Kananen

[57] ABSTRACT

Disclosed is an apparatus having a plurality of interfaces, each corresponding to one of a plurality of MFCs which provide voltage signals corresponding to the control voltages controlling the MFCs; a plurality of wires for transmitting the voltage signals from the interfaces; a position switch coupled to the plurality of wires for selecting voltage signals corresponding to one of the MFCs; and a plurality of displays coupled to the switch for providing a visual display of the values of said voltage signals corresponding to one of the MFCs. The invention enables an operator to monitor/calibrate a plurality of MFC operating voltages simultaneously without interfering with other operations of a system using MFCs.

12 Claims, 3 Drawing Sheets

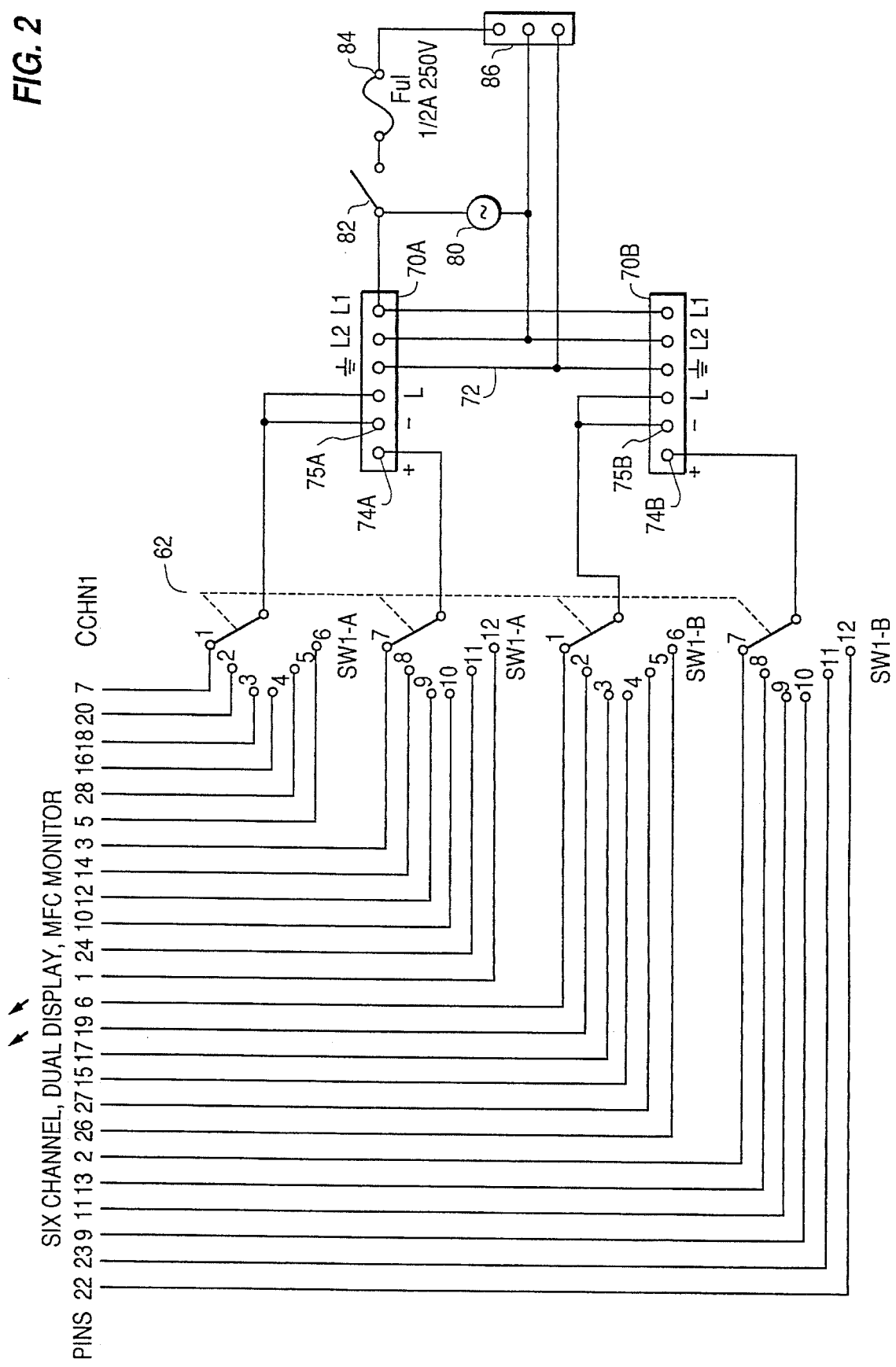

○ NOT USED

5,541,576

SIX CHANNEL DUAL DISPLAY MFC MONITOR

This application is a continuation of application Ser. No. 08/092,220 filed Jul. 16, 1993, now abandoned.

FIELD OF THE INVENTION

This invention relates to the monitoring of mass flow controllers (MFCs) used to supply precise amounts of various gases used in the production of integrated circuits. More particularly, this invention relates to an apparatus for simultaneously monitoring multiple voltages on one or more MFCs.

BACKGROUND OF THE INVENTION

When manufacturing semiconductor devices, it is common to utilize techniques requiring a high degree of precision. For example, the chemical vapor deposition (CVD) method used in manufacturing integrated circuits involves deposition of precise quantities of materials such as $SiH_4$ and $WF_6$ in precise ratios. In order to ensure that proper deposition is achieved, it is mandatory to use one or more calibrated MFCs to regulate such gas flows.

The mass flow controllers commonly used have five active dc voltage levels that must be monitored so that the MFCs can be properly calibrated within the necessary tolerance ranges. For example, the set point voltage and the flow voltage on each MFC must be monitored so as to maintain the desired deposition and ratio levels. These voltages must be measured with a sufficient degree of accuracy so that they may be compared in order to determine whether an MFC is operating properly or requires calibration.

Previous monitoring techniques experience various drawbacks. For example, according to at least one prior art monitoring technique, MFC voltage levels are monitored with a control device which also controls other functions of the MFC. Using such a device, the operator cannot control other functions of the system (e.g., a Genus system) while monitoring is being performed.

SUMMARY OF THE INVENTION

A general object of this invention is to overcome these and other drawbacks of the prior art by providing an apparatus which includes a plurality of interfaces, each corresponding to one of a plurality of MFCs and providing voltage signals corresponding to control voltages controlling the respective MFCs; a plurality of wires for transmitting the voltage signals from the interfaces; switching means coupled to the plurality of wires for selecting voltage signals corresponding to one of the MFCs; and a plurality of displays coupled to the switching means for providing a visual display of the values of said voltage signals corresponding to one of the MFCs.

According to one aspect of the invention, the displays are comprise of two 4½ digit LED displays each displaying a value of one of said voltage signals.

According to another aspect of the invention, the voltage signals correspond to the set-point voltage and the flow voltage of one of said plurality of MFCs.

According to another aspect of the invention, the displays includes power supply means for providing an ac supply to the LED displays.

According to another aspect of the invention, the displays and the switching means are contained in a single display unit.

According to another aspect of the invention, the switching means is coupled to the plurality of wires through a twenty-eight pin connector.

Finally, according to still another aspect of the invention, the switching means comprises a six position switch, whereby said apparatus may selectably monitor up to six separate MFCs, each having a corresponding channel.

BRIEF DESCRIPTION OF THE DRAWINGS

FIG. 2 is a circuit diagram showing a more detailed illustration of an embodiment of the disclosed invention.

DETAILED DESCRIPTION OF THE PREFERRED EMBODIMENT

Figure 1:
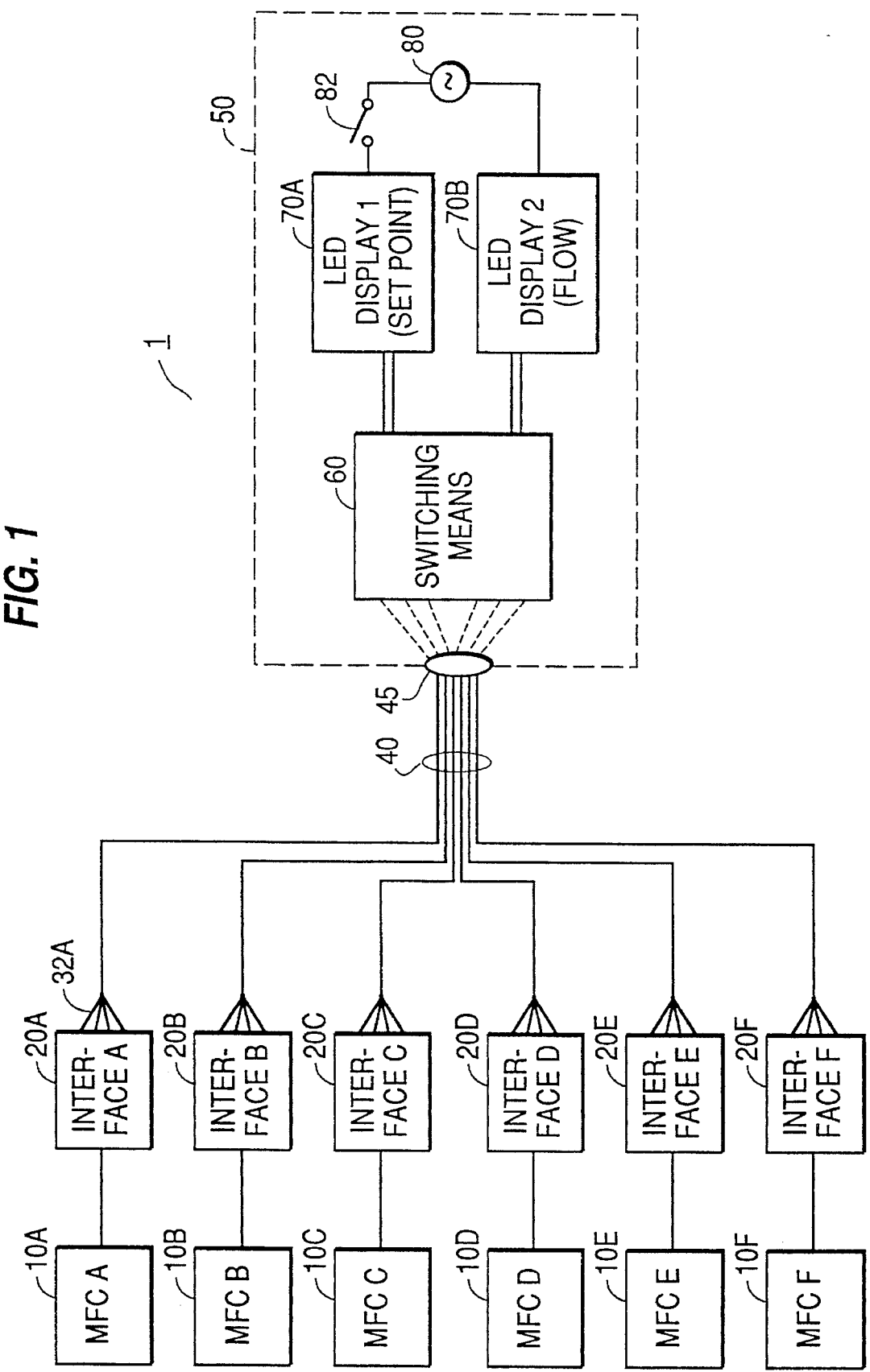
FIG. 1 is block diagram illustrating one embodiment of the disclosed invention.

FIG. 1 illustrates a monitoring apparatus 1 for monitoring a plurality of MFCs 10A, 10B, 10C, 10D, 10E, and 10F. Although six MFCs are disclosed, it is to be understood that the invention is not limited to this number, but rather could include any number of MFCs as long as the switching device is updated. Each MFC 10A, 10B, 10C, 10D, 10E, and 10F is coupled to a corresponding interface device 20A, 20B, 20C, 20D, 20E, and 20F, respectively. The interface devices are used to supply a plurality of voltage signals corresponding to voltage control signals which indicate the operation of each MFC.

In the preferred embodiment shown in FIG. 1, each interface is used to sample two direct current voltage supply signals from each MFC. In the example shown, these signals correspond to the set point voltage and the output voltage of each MFC. Other voltages could be sampled in a similar manner. Accordingly, each interface provides two sample dc voltage signals which, in the example shown, may have a value ranging from −15 V to +15 V measured relative to a common ground. Consequently, each channel corresponding to a single MFC and its two sampled control voltages requires four transmission wires. For example, MFC A, illustrated by block 10A, is coupled through Interface A, block 20A, to four transmission wires denoted 32A.

Each of the remaining MFCs is respectively coupled to corresponding transmission wires which are contained in cable 40 as shown. Thus, in this example, the cable 40 comprises twenty-four wires which provide six channels of information to the monitor display unit 50 (i.e., two inputs for six different channels provides twelve different signals). The individual wires of cable 40 terminate with a pin connector 45. In the preferred embodiment, the pin connector 45 is coupled to twenty-four pins, each of which is coupled to the switching means 60. In this way, the pin connector 45 provides a means to couple the plurality of MFCs to the switching means 60 of the display unit 50.

The switching means 60 is used to select a desired channel corresponding to the control voltages of any of the plurality of MFCs 10A–10F. Having selected the desired channel, the control signals are then supplied to a plurality of displays. In the preferred embodiment illustrated in FIG. 1, two 4½"

digit LED displays, 70A and 70B, are utilized so that both the set point voltage and output voltage may be monitored simultaneously. If desired, more displays could be used to display other voltage signals to be monitored.

In the preferred embodiment, the LED displays 70A and 70B are standard digital panel meters. According to this example, these meters have a sensitivity of ±19.999 V. Thus, the set point voltage and output voltage of each MFC can be measured to within ±1 mV. This resolution is sufficient for accurate monitoring/calibration of the MFCs of a typical CVD system. Moreover, the meters of the preferred embodiment have a relatively high input impedance in the order of a few megohms. Other conventional meters with greater or lower resolution and varying characteristics may be substituted as dictated by the degree of accuracy necessary.

Also contained in the monitor display unit 50 is a fused AC power supply 80 for supplying the LED displays 70A and 70B. In the preferred embodiment, this power supply 80 is coupled to a control switch 82 located on the monitor display unit. While an AC power supply is described, other means of supplying the meters with power may be used.

FIG. 2 illustrates a circuit diagram for a preferred embodiment of the invention. As shown in FIG. 2, LED displays 70A and 70B are powered by a conventional AC source through a connector 86 and a fuse 84. The AC supply eliminates display failure due to low battery source supply. A change-out of meters could allow DC voltages to be used.

Also shown in this drawing, as in FIG. 2, are twenty-four separate pins, externally coupled to six MFCs, which provide a six channel input to a dual display so that two control voltages of six MFCs may be displayed simultaneously. The pins supplying the control voltage signals are coupled to the display meters 70A and 70B through a two pole, two deck, six position switch 62. Switch 62, operable through a control knob located on the monitor display unit (not shown) may be used to select from one of six separate MFC channels.

Table A below sets forth the number of the pins which correspond to the each of six MFC channels A–F, as well as the signal supplied by each of the twenty-four pins.

TABLE A

| CHANNEL | DISPLAY 70A | DISPLAY 70B | GROUND 1 | GROUND 2 |
|---|---|---|---|---|
| A | 3 | 2 | 7 | 6 |
| B | 14 | 13 | 20 | 19 |
| C | 12 | 11 | 18 | 17 |
| D | 10 | 9 | 16 | 15 |
| E | 24 | 23 | 28 | 27 |
| F | 1 | 22 | 5 | 26 |

Figure 3A:
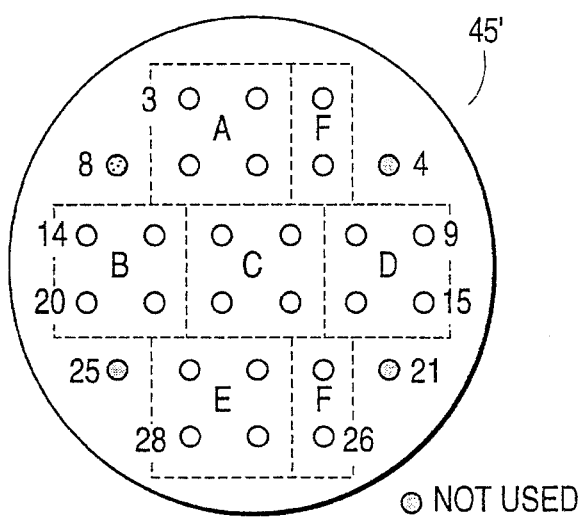
FIG. 3 is cross-sectional view of a pin-connector used in one embodiment of the invention.
Figure 3B:
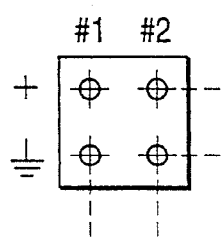

A twenty-eight pin connector 45 is shown in FIG. 3. In the preferred embodiment, such a connector 45 couples the twenty-four pins, providing the six dual MFC channels to the displays 70A and 70B, with the twenty-four signal transmission wires discussed in reference to FIG. 1. As shown in FIG. 3, each of the six channels A–F have four corresponding signal lines, two grounds and two display signals. The precise signals are set forth in Table A above.

For example, referring again to FIGS. 1 and 2, channel A, corresponding to MFC A is coupled to the display unit 50 through four pins, pin #3, pin #2, pin #7 and pin #6. Typically pin #3 and pin #2 provide the DC input signal (up to ±19.999 V), while pin #7 and pin #6, coupled to the LED meters 70A and 70B, respectively at input points 75A and 75B, remain at a common potential established through a line 72 as shown (FIG. 2). The signal provided by pin #3 drives the LED display 70A through an input point 74A. Similarly, pin #2 drives the LED display 70B through an input point 74B. As shown, four of the twenty-eight pins are unused.

Figure 4:
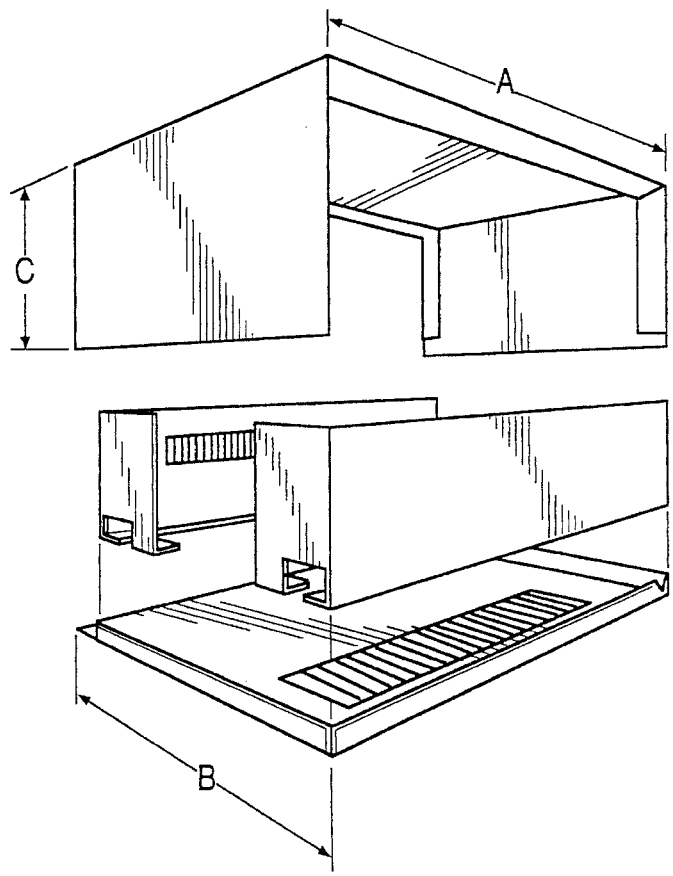
FIG. 4 is an illustration of a monitor display unit used in a preferred embodiment of the invention.

Finally, FIG. 4 illustrates in greater detail the dimensions of the monitor display unit 50 which contains the display meters. As shown, the display unit 50 is a conventional ventilated low profile instrument case. The relatively small size of the unit provides a more convenient means to monitor a MFC system.

Accordingly, the disclosed invention provides for a separate apparatus capable of continuously monitoring a plurality of simultaneous MFC operating voltages. It thereby facilitates easier calibration and maintenance of MFC operation.

The foregoing is a detailed description of the preferred embodiments. The scope of the invention, however, is not so limited. Various alternatives will be readily apparent to one of ordinary skill in the art. The invention is only limited by the claims appended hereto.

What is claimed is:

1. An apparatus for monitoring a plurality of mass flow controllers (MFCs) comprising:

a plurality of interface means, each of said interface means corresponding to one of said plurality of MFCs and each providing a first voltage signal representative of a set-point control voltage and a second voltage signal representative of an actual flow voltage associated with one of said plurality of MFCs;

means for transmitting said first voltage signal and said second voltage signal from each interface means;

display means for simultaneously displaying respective values of at least two voltage signals; and means for selectively coupling one of said plurality of interface means to said display means, whereby the respective values of the set-point control voltage and actual flow voltage of one of said MFCs are simultaneously displayed and monitored.

2. An apparatus for monitoring a plurality of mass flow controllers (MFCs) according to claim 1 wherein said display means comprises two 4½ digit light emitting diode (LED) displays which display respectively a value of said first voltage signal and said second voltage signal.

3. An apparatus for monitoring a plurality of mass flow controllers (MFCs) according to claim 1 wherein said coupling means includes a six position switch which selectively couples said first voltage signal and said second voltage signal from one of six MFCs to said display means, whereby said apparatus monitors operation of a selected one of said six MFCs.

4. The apparatus of claim 1 wherein said display means includes power supply means for providing an ac power supply to the LED displays.

5. The apparatus of claim 4 wherein said display means and said coupling means are contained in a single unit.

6. The apparatus of claim 5 wherein said coupling means is connected to said transmitting means through a connector.

7. A method of monitoring a plurality of mass flow controllers (MFCs) comprising:

providing a plurality of interface means, each of said interface means corresponding to one of said plurality of MFCs and each providing a first voltage signal representative of a set-point control voltage and a second voltage signal representative of an actual flow voltage associated with one of said plurality of MFCs;

transmitting said voltage signals from said interface means to a switching means;

selectively coupling with said switching means the first analog voltage signal and the second analog voltage signal from one of said MFCs to a display; and visually displaying the values of said first voltage signal and said second voltage signal corresponding to one of said MFCs, thereby monitoring the respective values of the set-point control voltage and the actual flow voltage of a selected one of said MFCs.

8. A method of monitoring a plurality of mass flow controllers (MFCs) according to claim 7 wherein said switching means comprises a six position switch selectively coupling the first voltage signal and the second voltage signal from one of six MFCs, whereby the set-point control voltage and the actual flow voltage of a selected one of said six MFCs are monitored.

9. A method of monitoring a plurality of mass flow controllers (MFCs) according to claim 8 wherein the step of visually displaying includes visually displaying the values of said first voltage signal and said second voltage signal with two 4½ digit light emitting diode (LED) displays.

10. The method of claim 9 wherein the step of visually displaying includes providing an ac power supply to the LED displays.

11. The method of claim 10, wherein said switching means and said LED displays are contained in a single unit.

12. The apparatus of claim 11 wherein said switching means is coupled to said plurality of wires through a connector.

* * * * *